(12) United States Patent
Pavan

(10) Patent No.: US 7,267,016 B2
(45) Date of Patent: Sep. 11, 2007

(54) SENSITIZED RING FOR USE WITH A SENSOR

(75) Inventor: Orlando Da Mota Pavan, Sao. Paulo (BR)

(73) Assignee: Sabo Industria e Comercio Ltda, S. Paulo, SP (BR)

( * ) Notice: Subject to any disclaimer, the term of this patent is extended or adjusted under 35 U.S.C. 154(b) by 102 days.

(21) Appl. No.: 11/167,554

(22) Filed: Jun. 28, 2005

(65) Prior Publication Data

US 2006/0076950 A1    Apr. 13, 2006

(30) Foreign Application Priority Data

Oct. 7, 2004    (BR) .................................. 0404360

(51) Int. Cl.
*G01B 7/30* (2006.01)

(52) U.S. Cl. ........................... 73/862.328; 73/862.325; 73/862.329; 324/173; 324/178; 324/179

(58) Field of Classification Search ........... 73/862.328; 324/173, 178, 179, 207.22

See application file for complete search history.

(56) References Cited

U.S. PATENT DOCUMENTS

| | | | | |
|---|---|---|---|---|
| 4,592,241 A | * | 6/1986 | Obayashi et al. | 73/862.328 |
| 4,602,515 A | * | 7/1986 | Eichenlaub | 73/862.328 |
| 5,476,272 A | * | 12/1995 | Hixson, II | 277/317 |
| 5,696,442 A | * | 12/1997 | Foster et al. | 324/173 |
| 6,392,405 B1 | * | 5/2002 | Nishizaki et al. | 324/173 |
| 6,498,475 B2 | * | 12/2002 | Foster et al. | 324/173 |
| 7,116,096 B2 | * | 10/2006 | Waszkowski et al. | 324/178 |
| 2002/0125882 A1 | * | 9/2002 | Foster et al. | 324/174 |
| 2003/0230449 A1 | * | 12/2003 | Nelson et al. | 180/403 |

* cited by examiner

*Primary Examiner*—Edward Lefkowitz
*Assistant Examiner*—Freddie Kirkland, III
(74) *Attorney, Agent, or Firm*—Arent Fox LLP

(57) ABSTRACT

A sensitizing ring for sensors having a reduced manufacturing cost and an improved profile shape manufacture with a diameter of 120 mm or less. The sensitizing ring of the present invention is used to measure the rate of rotation and position of a rotating element. The sensitizing ring of the present invention is usable in more applications, especially in the automotive industry. The sensitizing ring comprises a body, a plurality of teeth provided on an outer periphery thereof, and a plurality of gaps interposed between the teeth. The body is made of a polymeric material interspersed with a ferromagnetic material. Alternately, the body is made of a polymeric material having a coating layer of ferromagnetic material. In a further embodiment, the body includes ferromagnetic material in the polymeric material forming the teeth but does not include ferromagnetic material in the polymeric material forming the gaps. Optionally, body includes ferromagnetic material and gaps formed between the teeth do not have ferromagnetic material. Optionally a larger gap is provided on the body and similarly does not include ferromagnetic material.

7 Claims, 2 Drawing Sheets

SENSITIZED RING FOR USE WITH A SENSOR

BACKGROUND OF THE INVENTION

1. Field of the Invention

The present invention relates to a sensor sensitizing ring, such as a gear wheel, for monitoring rotating elements. The sensor sensitizing ring of the present invention has numerous suitable applications, such as automotive applications, as well as improved functionality.

2. Description of Related Art

Sensor sensitizing rings presently available in the art for measuring rate of spin and position of rotating elements, such as a wheel or axle, generally include a rigidly mounted sensitizing ring disposed around a rotating element. Sensor sensitizing rings have a plurality of peripheral sections, such as teeth, extending from an outer periphery of the sensitizing ring and are regularly distributed thereon, with gaps or notches disposed there between. A sensor, located proximate to the outer periphery of the ring, is sensitized differently by the teeth and notches of the sensitizing ring, wherein information relating to the rate of spin and position of the rotating element can be monitored. The sensor is connected to an electronic means for processing the information obtained.

Typically, a sensor of this type forms a part of an electronic injection system of automotive vehicles for gathering information on the rate of spin and position of vehicle axles. The rate of spin and position information is used by a processing center to generate commands for actuating actuators of a system.

Conventionally, sensitizing rings are manufactured from metal and include a ring having teeth with spaces formed therebetween. Conventional sensitizing rings are manufactured using traditional methods of metal processing, such as stamping.

Traditional manufacturing methods have difficulty manufacturing sensitizing rings with small diameters, such as diameters below 120 mm, for example, with an appropriate geometric profile to ensure the sensitizing rings generate an appropriate signal.

When the sensitizing rings are manufactured by a stamping operation, the teeth of the sensitizing ring have rounded or sinusoidal contours. However, for ideal functionality the teeth must have square contours. Therefore, there exists a need for a sensitizing ring with ideal functionality while also having a reduced production cost.

Additionally, sensitizing rings manufactured by cutting the notches in between the teeth are relatively fragile and prone to damage while being handled.

SUMMARY OF THE INVENTION

An objective of the present invention is to provide a sensitizing ring for sensors, particularly for use in the automotive industry, which will overcome the problems identified above, as well as others.

A second objective of the present invention is to provide a sensitizing ring that is manufactured with reduced complexity compared to sensitizing rings presently available.

A third objective of the present invention is to provide a sensitizing ring with a reduced cost.

Therefore, the sensitizing ring of the present invention includes a ring manufactured from a polymeric material (i.e., plastic). According to one embodiment of the present invention, a periphery of the teeth and notches undergo a ferromagnetic treatment that is different from each other. According to a second embodiment of the present invention, the teeth and notches include a ferromagnetic treatment to a surface thereof. According to a third embodiment of the present invention, the periphery of the notches do not incorporate the ferromagnetic treatment.

The sensitizing ring according to the present invention resolves the problems described above, since plastic injection molding or similar technology allows for manufacturing sensitizing rings with smaller diameters. Accordingly sensitizing rings may be used in smaller applications than presently available.

Additionally, sensitizing rings manufactured by polymeric injection molding, or similar process, result in peripheral sections and notches with a more precise shape or profile in comparison to metallic sensitizing rings produced by conventional manufacturing methods.

Furthermore, the sensitizing ring of the present invention provides for a simpler manufacturing process with a reduced cost compared to conventional sensitizing rings.

Additional advantages and novel features of the invention will be partially set forth in the description that follows and will also become apparent to those skilled in the art upon examination of the following or by learning upon practice of the invention.

BRIEF DESCRIPTION OF THE DRAWINGS

Other aspects of the present invention will be better understood from the following description, along with the accompanying drawings, wherein.

DETAILED DESCRIPTION

Figure 1:
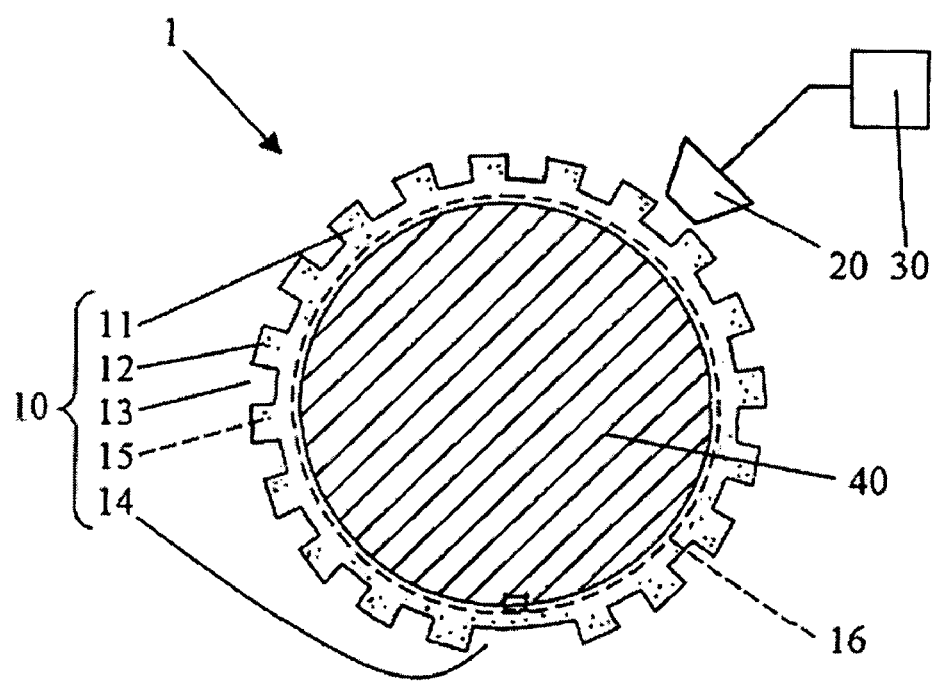
FIG. 1 represents a sensitizing ring installed within an exemplary configuration for monitoring a rate of spin and position of a rotating element, in accordance with one embodiment of the present invention.

Referring to FIG. 1, a sensitizing ring 10 of the present invention is part of a system 1 for gathering rate of spin and position information of a rotating element 40, such as an axle or wheel. The system 1 includes the sensitizing ring 10, secured to an outer periphery of the rotating element 40, and a sensor 20 sensitized by the sensitizing ring 10 when spinning. The sensor 20 senses the sensitizing ring 10 and generates a signal regarding the rate of spin and position of the rotating element 40. The system 1 also includes a signal regarding the rate of spin and position that is forwarded to an electronic means 30 for processing the signal and for generating a command signal.

The sensitizing ring 10 includes a body 11 having an inner diameter secured to an outer peripheral surface of the rotating element 40. First 12 and second 13 peripheral sections of the body are alternately formed on an outer periphery of the ring 10 at regularly spaced intervals. Optionally, sensitizing ring 10 may include a third peripheral section 14. According to one embodiment of the present invention, peripheral sections 12 are teeth, peripheral sections 13 are gaps, and peripheral section 14 is another gap. According to one embodiment, gap 14 essentially represents the absence of a tooth 12 and extends a length approximately equivalent to the size of two gaps 13 and a tooth 12.

The sensitizing ring 10 is manufactured from a polymeric material containing ferromagnetic particles (not shown). The sensitizing ring 10 is produced, for example, using an injection molding process.

Profiles of the teeth 12 and the gaps 13 include, for example, round profiles, wave profiles, or substantially square profiles. The body 11 of the ring 10 may optionally include a metallic hardening mesh 15.

In order to avoid the "relaxation effect" of polymeric materials, the sensitizing ring 10 may include a metallic insert 16, disposed between the sensitizing ring 10 and the rotating element 40,.

The sensitizing ring 10 thus constructed works substantially similarly to conventional sensitivity rings, i.e., when a tooth 12 or a gap 13 alternately passes near the sensor 20, the sensor 20 alternately generates different corresponding electric signals, which are sent to and processed by the electronic means 30. In turn, the electronic means 30 generates adequate command signals.

Figure 2:
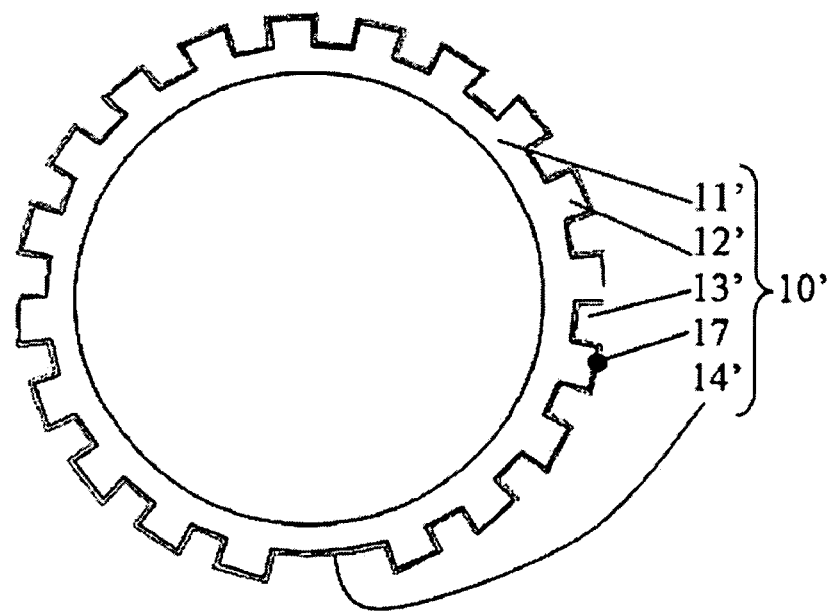
FIG. 2 illustrates the sensitizing ring according to a second embodiment of the present invention.

Referring to FIG. 2, a sensitizing ring 10', according to a second embodiment of the present invention, includes a body 11' manufactured from a polymeric material without ferromagnetic particles and is produced, for example, using an injection molding process. Teeth 12', gaps 13', and gap 14' are provided on an outer periphery of the body 11'. The body 11' of the sensitizing ring 10' includes a coating layer made from a meblização type of ferromagnetic material 17.

Figure 3:
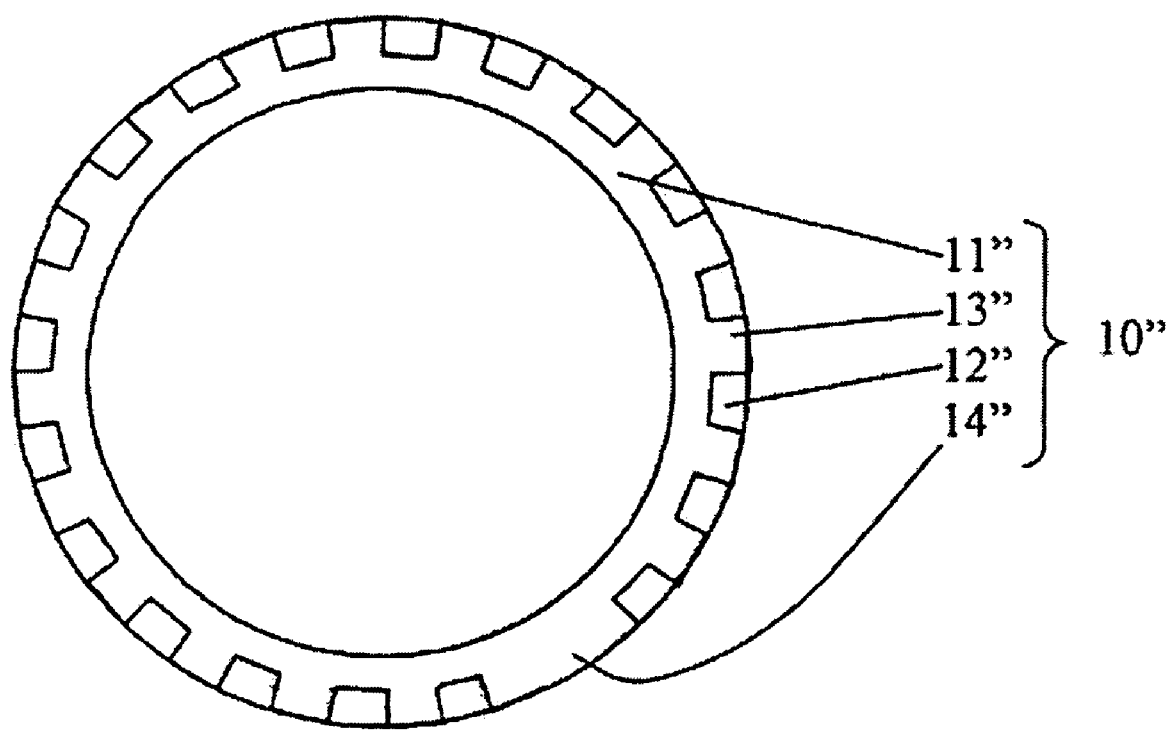
FIG. 3 illustrates the sensitizing ring, in accordance with a third embodiment of the present invention.

FIG. 3 illustrates a third embodiment of the present invention, wherein a sensitizing ring 10" includes body 11" manufactured from a polymeric material without ferromagnetic particles. An outer peripheral surface of the sensitizing ring 10" includes teeth 12" having ferromagnetic material and gaps 13" without ferromagnetic material. The teeth 12" and gaps 13" are arranged in an alternating fashion at regular intervals. A gap 14", also lacking ferromagnetic material, is formed on the outer periphery of the sensitizing ring 10" and extends a length approximately equivalent to the size of two gaps 13" and a tooth 12".

Further, sensitizing rings 10' and 10" may be manufactured having diameters of 120 mm and smaller.

While there has been described what are at present considered to be preferred embodiments of the present invention, it will be understood that various modifications may be made thereto, and it is intended that the appended claims cover all such modifications as fall within the true spirit and scope of the invention. Other modifications will be apparent to those skilled in the art.

The invention claimed is:

1. A sensitizing ring for use with a sensor comprising:
   a body;
   a plurality of teeth disposed on an outer periphery of the body; and
   a plurality of gaps interposed between the plurality of teeth,
   wherein the body is made of a polymeric material containing particles of ferromagnetic material,
   wherein the polymeric material forming the gaps is free of the ferromagnetic material, and
   wherein a signal is generated by the sensor located proximate to the body when the body moves relative to the sensor.

2. The sensitizing ring according to claim 1, wherein the ferromagnetic material forms a layer on an outer surface of the teeth body.

3. The sensitizing ring according to claim 1, wherein the ferromagnetic material is included within the polymeric material forming the plurality of teeth.

4. The sensitizing ring according to claim 3, wherein at least one of the plurality of teeth interposed between adjacent gaps is absent to define a larger gap relative to the remaining gaps from the plurality of gaps.

5. The sensitizing ring according to claim 1, wherein the plurality of teeth and the plurality of gaps have substantially orthogonal profiles.

6. The sensitizing ring according to claim 1, wherein the ferromagnetic material is a metallic mesh disposed within the polymeric material and wherein the body further comprises a metallic insert disposed about an inner diameter of the body.

7. The sensitizing ring according to claim 1, wherein a diameter of the ring is 120 mm or less.

* * * * *